US006451896B1

(12) United States Patent
Wandelmaier et al.

(10) Patent No.: US 6,451,896 B1
(45) Date of Patent: Sep. 17, 2002

(54) COATING SYSTEM FOR THE PREPARATION OF AQUEOUS COATING COMPOSITIONS

(75) Inventors: Klaus Wandelmaier, Wuppertal; Stefan Wiggershaus, Schwelm, both of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/560,751

(22) Filed: Apr. 28, 2000

(51) Int. Cl.$^7$ .................................................. C08K 3/34
(52) U.S. Cl. ....................... 524/445; 524/440; 524/441; 524/501; 524/589; 524/591; 523/171
(58) Field of Search ................................. 524/445, 441, 524/440, 501, 507, 513, 589, 591; 523/171, 179; 427/388.4, 385.5, 393.5, 409, 412.5, 418

(56) References Cited

U.S. PATENT DOCUMENTS

| | | | |
|---|---|---|---|
| 4,489,135 A | 12/1984 | Drexler et al. | 428/423.1 |
| 4,558,090 A | 12/1985 | Drexler et al. | 524/591 |
| 5,141,987 A | 8/1992 | Nachtkamp et al. | 524/591 |
| 5,401,795 A | 3/1995 | Brock et al. | 524/539 |
| 5,492,961 A | 2/1996 | Brock et al. | 524/539 |
| 5,552,496 A | 9/1996 | Vogt-Birnbrich et al. | 525/440 |
| 5,556,912 A | 9/1996 | Brock et al. | 524/507 |
| 5,635,559 A | 6/1997 | Brock et al. | 528/76 |
| 5,658,617 A | 8/1997 | Gobel et al. | 427/372.2 |
| 5,672,649 A | 9/1997 | Brock et al. | 524/507 |
| 5,691,425 A | 11/1997 | Klein et al. | 525/455 |
| 5,854,337 A | 12/1998 | Wandelmaier et al. | 524/591 |
| 6,025,031 A | * 2/2000 | Lettmann et al. | 427/388.4 |

FOREIGN PATENT DOCUMENTS

| | | |
|---|---|---|
| CA | 2107351 | 1/1992 |
| CA | 2174663 | 6/1995 |
| DE | 4415292 A | 11/1995 |
| DE | 19714577 A | 10/1998 |
| DE | 198 49 321 A1 | 4/2000 |
| EP | 0 038 127 | 10/1984 |

OTHER PUBLICATIONS

European Search Report for EP 01 10 2090, dated Jul. 30, 2001.

* cited by examiner

*Primary Examiner*—Edward J. Cain
(74) *Attorney, Agent, or Firm*—Steven C. Benjamin

(57) ABSTRACT

Coating system for the preparation of aqueous coating compositions used for the preparation of waterborne basecoats for the coating of vehicles and vehicle parts in vehicle repair coating, containing:

A) 55–95 wt-% of at least one special effect composition, containing at least 15 wt-% water, special effect pigments, at least one water-dilutable resin selected from the group of polyurethane, polyester, and poly (meth)acrylate resins, and optionally organic solvents and additives conventionally used I coating, and B) 5–45 wt-% of a pigment-free component, containing:
  B1) 0.3–5.0 wt-% of at least one inorganic layered silicate,
  B2) 1.0–20.0 wt-% of at least one water-dilutable polyurethane resin, which optionally can be modified
  B3) 75.0–98.7 wt-% water;

And optionally organic solvents and additives conventionally used in coating, whereby the wt-% of A and B total 100 wt-% and the wt-% of B1, B2 and B3 total 100 wt-% of component B.

11 Claims, No Drawings

COATING SYSTEM FOR THE PREPARATION OF AQUEOUS COATING COMPOSITIONS

FIELD OF THE INVENTION

The invention relates to an aqueous coating system containing at least two components, and its use for the preparation of aqueous coating compositions, in particular for the preparation of waterborne basecoats. The aqueous coating system can be used for coating vehicles and vehicle parts, in particular in vehicle repair coating.

BACKGROUND OF THE INVENTION

In the field of vehicle coating, in particular of vehicle repair coating, there are different ways of preparing water-based coatings. In order to respond to an increasing number and variety of colour shades and to obtain a perfect repair coating with exactly matching colour shades, mixing systems are conventionally used in vehicle repair coating, whereby different base colours are kept in the form of mixing colours or pigment pastes and a defined number of base colours are mixed together shortly before application according to a given mixing formula, depending on the desired colour shade. Meanwhile, apart from solvent-based mixing systems, there are also systems based on aqueous coatings. The waterborne basecoats to be used can be modified with rheology-influencing compounds, for example layered silicates or thickeners based on polyacrylate or polyurethane/urea in order to obtain an optimal rheological behaviour. The rheology-influencing compounds can thereby be added to the waterborne basecoats directly while they are being prepared or as an additional component in a mixing system.

In EP-A-578 645 a mixing system for vehicle repair coating is described with base colours A, which contain less than 5 wt-% water, pigments, water-dilutable polyurethane, aminoplast, polyacrylate and/or polyester resins and organic solvents, and with pigment-free components B, which contain water, water-dilutable polyurethane, aminoplast and/or polyester resins, whereby rheology additives can also be contained in component B.

A disadvantage of this mixing system is the unfavourable flowing behaviour of the components A as well as the unfavourable metering capacity of these components and their problematic miscibility with the components B. Furthermore, the coating compositions prepared according to these mixing systems show a poor sagging resistance, in particular at critical places such as flanges, edges or corners, as well as unsatisfactory special effect properties.

EP-A-730 626 describes an aqueous coating system of 2 components, with a component I, which contains water, water-dispersable binders, pigments and additives and a component II, consisting of water and a rheology additive, preferably a layered silicate. This coating system has been shown to be unfavourable in particular in the preparation of special effect coatings. The special effect coatings prepared with this coating system show poor special effect properties and poor sagging resistance as well as insufficient covering of irregularities in the substrate, deriving for example from sanding marks of an applied and sanded primer surfacer. The coating compositions are moreover difficult to filter.

EP-A-608 773 describes a modular system for the preparation of aqueous coating compositions, which contains special effect modules with at least 20 wt-% water, pigments and water-dilutable binders, and binder modules with water-dilutable binders, water and optionally organic solvents and/or additives. Mention is generally made of a rheology module that can be optionally co-used, which contains rheology additives and water as well as optional water-dilutable binders. Nothing is said, however, about the precise composition and handling of such a rheology module. The aqueous coating compositions prepared with this modular system also still show disadvantages with respect to special effect properties, covering capacity and sagging resistance.

There is a need for aqueous coating compositions useful as waterborne basecoats, which contain special effect pigments, have suitable rheology, improved covering capacity as well as an improved sagging resistance. In addition, the coating compositions should be stable during storage for a long period of time, for example 12 months, and should be easily filtered before their use. Further, coatings which cover the substrate in an excellent manner should be obtained.

SUMMARY OF THE INVENTION

This need is satisfied by the coating system for the preparation of aqueous coating compositions to be described hereinafter. The coating system comprises in combination the following separate components:

A) 55–95 wt-% of at least one special effect pigment composition comprising, water, at least one special effect pigment, and at least one water-dilutable resin selected from the group consisting of at least one water-dilutable resin selected from polyurethane, polyester and poly(meth)acrylate resin, the amount of water constituting at least 15 wt % of the total weight of said component A and B) 5–45 wt-% of a pigment-free composition comprising
B1) 0.3–5.0 wt-% of at least one inorganic layered silicate,
B2) 1.0–20.0 wt-% of at least one water-dilutable polyurethane resin,
B3) 75.0–98.7, wt-% water.

The special effect pigment present in component A have a plate-like structure which in the coating on the substrate provides a change in colour and/or brightness depending on the light angle of incidence or angle of observation. The wt %s of components A and B total 100 wt %, and the wt %s of B1, B2, and B3 total 100 wt % of component B. In component B, the preferred amount of B1 is 0.5–3.0 wt %, the preferred amount of B2 is 2.0–10.0 wt %, and the preferred amount of water is 87.0–97.5 wt %. Preferred coating systems according to the invention contain 70–95 wt-% of component A and 5–30 wt-% of component B.

The aqueous coating composition is prepared by mixing together components A and B and the resultant aqueous coating composition produces surprising results as a waterborne basecoat for such substrates as vehicles and vehicle parts. The components by themselves are storage stable, as are the aqueous coating compositions prepared therefrom. Such compositions exhibit excellent rheology. Such compositions also exhibit very good special effect properties and a good sagging resistance, in particular at critical places, and a very good covering of the substrate, including the masking of surface irregularities such as sanding marks.

The coating system according to the invention can contain additional components as part of the combination of separate components, for example at least one of the components C, D and E, as follows:

C) at least one colour composition comprising water, at least one colour pigment, and at least one water-dilutable resin selected from the group consisting of polyurethane, polyester, and poly(meth)acrylate resins, D) at least one cross-linking composition comprising at least at least one cross-linking agent, and E) at least one binder composition comprising at least one water-dilutable binder resin. These additional components extend the utility of the aqueous coating composition prepared from components A and B, without detracting from the advantageous coating characteristics of the composition.

DETAILED DESCRIPTION OF THE INVENTION

One or more of each component can be present in the coating system according to the invention. For simplification, the singular shall be used in the description of each component hereinafter.

Component A contains one or more water-dilutable binders. The water-dilutable binders are conventional water-dilutable polyurethane, polyester and/or poly(meth)acrylate resins and include the modified resins thereof, known to the skilled person.

The water-dilutable binders mentioned can be ionically and/or nonionically modified in order to obtain sufficient water dilutability, i.e. dispersibility in water. An anionic and/or a non-ionic modification is preferred. An anionic modification can be obtained, for example, by way of at least partially neutralized carboxyl groups. A non-ionic modification can be obtained, for example, by incorporating polyethylene oxide units.

Examples of water-dilutable polyurethane resins are those, for example, with a number average molecular mass Mn of 1000 to 500 000 g/mol, preferably 5000 to 300 000 g/mol, an acid value of 10 to 100 mg KOH/g, preferably of 20 to 80 mg KOH/g, and a hydroxyl value of 0 to 400 mg KOH/g. Appropriate polyurethane resins which may be used are for example prepared by reacting compounds which are reactive with respect to isocyanate groups and polyisocyanates having at least 2 free isocyanate groups per molecule.

Polyols of high molecular weight can be used as compounds which are reactive with respect to isocyanate groups, preferably polyester polyols, polyether polyols and/or polycarbonate polyols with a molecular mass of, for example, 500–6000 g/mol. Polyols of low molecular weight with a molecular mass of 60–400 g/mol can also be co-used. Aliphatic and/or cycloaliphatic diisocyanates can preferably be used as polyisocyanates. Examples of useful polyisocyanates are phenylene diisocyanate, xylylene diisocyanate, diphenylmethane diisocyanate, isophorone diisocyanate, dicyclohexylmethane diisocyanate, tetramethylene diisocyanate, hexamethylene diisocyanate. In order to obtain a sufficient water-dilutability, the polyurethane resins can be modified, for example, with anionic groups as described above. The anionic groups can be introduced by way of compounds having at least one group reactive with respect to isocyanate groups and at least one group capable of producing anions. Preferred compounds of this type are dihydroxycarboxylic acids, with particular preference for dimethylolpropionic acid.

The thus obtained polyurethane resins can still be subjected to chain extension to increase the molecular weight. For example NCO-functional polyurethane prepolymers can be reacted with compounds which are reactive with respect to isocyanate groups. Compounds which are reactive with respect to isocyanate groups are in particular compounds with hydroxyl and/or secondary and/or primary amino groups. OH-functional polyurethane prepolymers can be chain extended for example with polyisocyanates The water-dilutable polyurethane resins include such resins which are in modified form, for example as silicon-modified or (meth)acrylated polyurethane resins. (Meth) acrylated polyurethane resins can for example be prepared by radically initiated polymerisation of polyurethane macromonomers with carboxyl groups and lateral as well as optionally terminal vinyl groups in the presence of one or more copolymerisable unsaturated monomers.

Examples of water-dilutable polyurethane resins which may be used are described in U.S. Pat. Nos. 5,492,961, 5,141,987, 5,556,912, DE-A-41 15 042, U.S. Pat. No. 5,635,559, DE-A-43 23 896, U.S. Pat. No. 5,691,425, DE-A-42 28 510, U.S. Pat. Nos. 5,854,337, 4,489,135.

Examples of water-dilutable poly(meth)acrylate resins include all water-soluble or water-dispersable poly(meth) acrylate resins which are suited for aqueous coatings. For example, they can be those with a number average molecular mass Mn of 1000–200 000 g/mol, an acid value of 15–150 mg KOH/g and a hydroxyl value of 0–400 mg KOH/g. The water-dilutable poly(meth)acrylate resins can also have been prepared in the presence of oligomeric or polymeric polyester and/or polyurethane resins.

Examples of water-dilutable polyester resins include all water-soluble or water-dispersable polyester resins which are suited for aqueous coatings, for example those with a molecular mass of 500–5000 g/mol, an acid value of 15–150 mg KOH/g and a hydroxyl value of 0–400 mg KOH/g.

The water-dilutable binders can each be used individually or as a mixture of binders.

Preferably water-dilutable polyurethane resins are used as binders in component A, particularly preferred being mixtures of water-dilutable polyurethane resins. Preferable suitable mixtures are for example those of (meth)acrylated polyurethane resins and carbonate group-containing polyurethane resins, as are described in U.S. Pat. No. 5,492,961 or those of (meth)acrylated polyurethane resins and polyurethane resins without carbonate groups, which have been prepared through chain extension of OH-functional polyurethane prepolymers with polyisocyanates, such as described in U.S. Pat. No. 5,556,912.

Preferred polyurethane resins or mixtures of polyurethane resins may also be used in combination with other water-dilutable binders mentioned above.

The water-dilutable binders may be of a physically drying nature or may be cross-linked by forming covalent bonds. Potential cross-linkable groups are, for example, hydroxyl, amino, carboxyl, epoxy, acetoacetyl and unsaturated groups. If cross-linkable groups are present they are preferably hydroxyl groups.

If the water-dilutable binders are cross-linkable by forming covalent bonds, they can be self-cross-linking or externally cross-linking. Preferably they are, however, externally cross-linking.

Component A further contains special effect pigments. Examples of special effect pigments which may be used are metallic pigments, e.g., of aluminium or copper, interference pigments such as, e.g., metallic pigments coated by metal oxides, e.g., titanium dioxide-coated, iron oxide-coated or mixed oxide-coated aluminium, coated mica, such as, e.g., titanium dioxide-coated mica and/or mica coated with other metal oxides, e.g. with $Fe_2O_3$ and/or $Cr_2O_3$, iron oxide flake and graphite pigments. Further examples of special effect-imparting pigments which may be used are the so-called OV-pigments (OV=optical variable). These pigments are pigment flakes with a special multi-layered thin-layer-interference structure. The layers are composed individually, for example, of a highly reflecting metal layer (for example aluminium, chrome, etc.), a transparent dielectric layer (for example $SiO_2$, $MgF_2$, $TiO_2$, etc.) and a semi-transparent metal layer (for example Cr, Al, Ni, Mo, etc.). A symmetrical structure with the highly reflecting metal layer in the middle is also possible. Likewise, other layer structures, for example with a non-metallic core (for example $SiO_2$), are possible. Further special effect-imparting pigments which may be used are the so-called LCP-pigments (LCP=liquid crystal polymer). These are pigments which can be obtained by orienting and three-dimensionally cross-linking substances of a liquid crystal structure with a chiral phase. All the special effect pigments that can be used, can be used each individually or in combination.

Component A further contains preferably at least 25 wt-%, and more preferably, 30–75 wt-% water, based on the total weight of component A.

Component A can also contain organic solvents and additives conventionally used in aqueous coating compositions.

The organic solvents are solvents conventionally used in coating techniques. These may originate from the preparation of the binders or are added separately. Examples of suitable solvents are monohydric or polyhydric alcohols, e.g. propanol, butanol, hexanol; glycol ethers or esters, for example diethylene glycol dialkyl ether, dipropylene glycol dialkyl ether, each with C1- to C6-alkyl, ethoxypropanol, butyl glycol; glycols, for example ethylene glycol, propylene glycol, N-methyl pyrrolidone and ketones, e.g. methyl ethyl ketone, acetone, cyclohexanone; aromatic or aliphatic hydrocarbons, for example toluene, xylene, or straight-chain or branched aliphatic C6–C12-hydrocarbons. If organic solvent is present, is preferably water-miscible organic solvents. If present, the organic solvents are present in proportions of up to, for example, at the most 10–15 wt-%, based on the total component A.

Examples of additives conventionally used in coating are levelling agents, rheology-influencing agents, such as highly dispersed silicic acid or polymeric urea compounds, thickeners, such as carboxyl group-containing polyacrylate thickeners or associative thickeners based on polyurethane, defoamers, surface-active agents, anti-crater agents, bonding agents and curing accelerators. The additives are used in conventional amounts known to the skilled person.

Component A of the coating system according to the invention can be a coating composition finished as such or a component of a mixing system, for example in the form of a mixing colour or a pigment paste. Component A can also contain a combination of colour and special effect pigments. Preferably component A, whether a single or plurality of components, has only special effect pigments. One or more special effect pigments can thereby be provided for the coating system.

A preferred component A contains:
A1) at least one water-dilutable optionally modified polyurethane resin,
A2) at least one special effect pigment and optionally at least one colour pigment,
A3) 25–75 wt-% water, and optionally organic solvents and additives conventionally used in coating.

Component A can comprise for example a weight ratio of special effect or total pigment to binder of 0.02:1 to 10:1. The ratio of pigment to binder is thereby dependent for example on the type of pigments used and on whether component A is a mixing colour or a pigment paste.

Component A can be prepared in a manner known to the person skilled in the art by mixing and homogenizing the individual components. Water-dilutable organic solvents and optionally additives can be added to the special effect pigments, which can be provided, for example, in the form of a commercially available paste, and the pigments are subsequently mixed under shearing with the water-dilutable binders. A paste resin can however also be used for the preparation of component A.

Component B is the rheology additive essential to the invention and contains at least one water-dilutable polyurethane resin as its essential component. All the water-dilutable polyurethane resins known to the person skilled in the art may be used in principle, as they are used for formulating water-based coatings. Those suitable are for example the water-dilutable polyurethane resins, including the optionally modified water-dilutable polyurethane resins, mentioned above in the description of component A. They can be film-forming polyurethane resin binders or polyurethane paste resins of the above mentioned type.

Particularly suitable are polyurethane paste resins, which are water-dilutable polyurethane resins having an acid value of 10–50 mg KOH/g and a number average molecular mass Mn of 3000–200 000, which are obtained by reacting at least one polyester polyol having an OH-value of 35–200 mg KOH/g and a molecular mass of 500–5000 g/mol with a compound having at least one group which is reactive with respect to NCO-groups and at least one acid group capable of producing anions and with at least one polyisocyanate, preferably diisocyanate, such as described for example in U.S. Pat. No. 4,558,090. Expediently useful are likewise hydroxy-functional polyurethane urea resins with a urea group content of 10–300 mmol in 100 g solid resin and a urethane group content of 20–300 mmol in 100 g solid resin, an OH-value of 20–250 and a number average molecular mass Mn of 1000–20 000 g/mol such as described in German Patent Application DE-A-198 49 321.

Component B further contains at least one inorganic layered silicate as essential component for the rheology additive. Inorganic layered silicates such as aluminum-magnesium-silicates, sodium-magnesium-silicates and sodium-magnesium-fluoro-lithium-silicates having a layered structure can be used for example. Examples of layered silicates that can be used are those of the type bentonite, smectite, montmorrilonite and hectorite. Layered silicates of natural origin can be used, but synthetically prepared layered silicates are preferred. The layered silicates are known to the person skilled in the art and are commercially available, for example as Optigel®-products and Laponite®-products.

Component B further contains water and optionally organic solvents and additives conventionally used in coating. The organic solvents and additives conventionally used in coating are for example the ones mentioned above in the description of component A.

The amount of layered silicate in component B and the amount of component B in the coating system according to the invention can preferably be chosen such that a content of layered silicate of about 0.1–1.5 wt-%, based on the amount of component A, is obtained with the coating system according to the invention.

Component B can contain additional rheology additives in addition to the layered silicates. Rheology control additives conventionally used in water-based coatings can be used as additional rheology additives. Examples are synthetic polymers with ionic groups and/or groups having an associative effect such as polyvinyl alcohol, poly(meth)acrylamide, poly(meth)acrylic acid, styrene-maleic acid anhydride or ethylene-maleic acid anhydride copolymers and their derivatives as well as polyurethane. Cross-linked polymer microparticles, such as described for example in EP-A-38 127, may further be used.

It is advantageous for formulating aqueous coating compositions of the coating system according to the invention if rheology additives are likewise included in component A. In particular, however, layered silicates should preferably not be contained in component A as a rheology additive. Suitable rheology additives for component A are for example rheology additives with ionic groups and/or groups having an associative effect, based on poly(meth)acrylamide, poly (meth)acrylic acid and/or polyurethane.

Components C, D and/or E can further be present in the coating system according to the invention for the preparation of aqueous coating compositions.

The colour component C contains water-dilutable binders (one or more). The water-dilutable binders are conventional water-dilutable polyurethane, polyester and/or poly(meth) acrylate resins known to the person skilled in the art, such as described above for component A. Preferred water-dilutable resins are the same as used in component A.

Component C further contains colour pigments. Suitable colour pigments are all pigments of an organic or inorganic nature which are conventionally used in coating. Examples of inorganic or organic colour-imparting pigments are titanium dioxide, micronised titanium dioxide, iron oxide pigments, carbon black, azo pigments, phthalocyanine pigments, quinacridone, perylene or pyrrolopyrrole pigments. Optionally soluble dyes and/or transparent pigments can also be included.

Component C further contains water, preferably, at least 25 wt-%, and more preferably 25–75 wt-% water.

Component C can likewise contain organic solvents and additives conventionally used in coating, for example those mentioned above in the decription of component A.

Component C of the coating system according to the invention can be, like component A, a coating composition finished as such or a component of a mixing system, for example in the form of a mixing colour or of a pigment paste. Component C can also contain a combination of colour pigments.

A preferred component C contains:

C1) at least one water-dilutable polyurethane resin,
C2) at least one colour pigment,
A3) 25–75 wt-% water, and optionally organic solvents and additives conventionally used in coating.

Component C can thereby for example have a ratio of pigment to binder of 0.01:1 to 10:1. The ratio of pigment to binder is thereby dependent for example on the type of pigments used and on whether component C is a mixing colour or a pigment paste.

Component C can be prepared in conventional manner by dispersing and homogenizing in suited aggregates. This can be carried out for example by grinding the colour pigments in one part of the water-dilutable binders and by subsequent completion with the remaining part of the water-dilutable binders. The grinding of the pigments can however also be carried out in a conventional paste resin, for example polyurethane paste resin. Subsequently completion can be carried out with the water-dilutable binders. It is however also possible to prepare component C by using only a paste resin. In this case component C is then directly used as pigment paste. Examples of preferred polyurethane paste resins which can be used are described in U.S. Pat. No. 4,558,090 and in German Patent Application DE-A-198 49 321.

Component D contains one or more cross-linking agents. Component D can be used when binders with cross-linkable groups are used in at least one of the other components of the coating system according to the invention. The type of cross-linking agents in component D depends on the cross-linkable functional groups of the water-dilutable binders in the other components. The cross-linking agents can for example be formaldehyde-condensation resins, such as phenol-formaldehyde and amine-formaldehyde condensation resins, as well as blocked and non-blocked polyisocyanates. Suitable amino resins as cross-linking agents are for example alkylated condensation products, which are prepared by converting aminotriazines and amidotriazines with aldehydes. Suitable polyisocyanates as cross-linking agents are for example any organic polyisocyanates having aliphatic, cycloaliphatic, araliphatic and/or aromatically bonded free isocyanate groups. They are liquid at room temperature or liquefied by addition of organic solvents. The polyisocyanates generally have a viscosity at 23° C. of 1 to 6000 mPas, preferably above 5 and below 3000 mPas. Such polyisocyanates are known to the person skilled in the art and are commercially available.

Preferably the polyisocyanates are polyisocyanates or polyisocyanate mixtures with solely aliphatically and/or cycloaliphatically bonded isocyanate groups with an average NCO-functionality of 1.5 to 5, preferably 2 to 3.

Especially suitable are for example "coat-polyisocyanates" based on exa-methylene diisocyanate, 1-isocyanato-3,3,5-trimethyl-5-isocyanatomethyl-cyclohexane (IPDI) and/or bis(isocyanatocyclohexyl)-methane and the known derivatives of these diisocyanates having biuret, allophanate, urethane and/or isocyanurate groups, which can be obtained for example through trimerisation or reaction with water or alcohols such as trimethylolpropane.

Polyisocyanates which are sterically hindered are likewise also suited. Examples of the latter are 1,1,6,6-tetramethyl-hexamethylene diisocyanate, 1,5-dibutyl-pentamethyldiisocyanate, p- or m-tetramethylxylylene diisocyanate and the corresponding hydrated homologues.

Further cross-linking agents known in the coating industry can however also be used, as long as the corresponding reactive groups are provided in the binders used.

Preferably polyisocyanate cross-linking agents are included in component D.

Component D can also contain water, one or more organic solvents and/or additives conventionally used in coating. The organic solvents and additives conventionally used in coating are for example the ones mentioned above in the description of component A.

When used, the amount of component D will be that which provides an amount of cross-linking agent to crosslink the crosslinkable resin present in another component of the coating system when combined into an aqueous coating composition.

Component E can be used, if there is a wish to complement the coating compositions prepared from components A and B and optionally C and D with one or more additional binders, the so-called let down resins. Component D therefore contains one or more water-dilutable let down resins. The let down resins can for example be the water-dilutable binders mentioned above in the description of component A, if they are not expressly indicated as paste resins. The let down binders can be identical to the water-dilutable binders of components A, B and/or optionally component C, or be different from them, but they must however be compatible with the water-dilutable binders of these components.

In the coating system according to the invention, the pigment-containing components can each be one or more components A and optionally one or more components C, each component having a composition with falls within the description of component A or C as the case may. Preferably more components A and more components C are present, in order to obtain a multitude of variously pigmented special effect coatings, each with the desired special effect colour shade, by mixing a defined number and amount of these components.

For the preparation of coating compositions, components A, B and optionally C, D and/or E of the coating system according to the invention are mixed together, to provide each desired special effect aqueous coating composition. Mixing can be carried out simply by stirring. The good miscibility, in particular of components A and B and optionally of component C, is particularly advantageous. Mixing of components A, B and optionally C, D and/or E can be carried out preferably directly before the application. Prior to the application, if necessary, water and/or organic solvents may in general still be used for adjusting the spray viscosity.

The pigmented aqueous coating compositions prepared with the coating system according to the invention can be expediently used in connection with a multi-layer coating. They are in particular suitable for the preparation of special effect base coat layers in a multi-layer coating.

The invention therefore also relates to the use of the pigmented aqueous coating compositions prepared with the coating system according to the invention in a process for multi-layer coating, wherein a base coat layer of a special effect waterborne basecoat composition is applied on a substrate, bare or precoated, and a clear coat layer of a transparent clear coat composition is applied to the thus obtained base coat layer, and whereby the base coat layer of a colour and/or special effect waterborne basecoat composition, which is prepared with the coating system according to the invention, is applied.

The application of the pigmented aqueous coating compositions prepared with the coating system according to the invention is carried out according to conventional methods, preferably by spray application. The coating compositions are for example applied in resulting dry film thicknesses of 10–30 $\mu$m. Metal and plastics substrates, in particular those known in the vehicle industry, are suitable, such as, for example, iron, zinc, aluminium, magnesium, or alloys thereof, and polyurethanes, polycarbonates, or polyolefins. Said substrates include those which are usually precoated, for example, with conventional primers and/or conventional primer surfacers. The primers and/or primer surfacers may be conventional coating agents of the kind used as primer surfacers and/or primers by those skilled in vehicle coating. For example, they may be primer and/or primer surfacer layers applied within the context of repair coating, with binder systems based on e.g. binders of a physically drying nature, such as physically drying polyurethane and/or polyacrylate resins, and chemically cross-linking binders, such as epoxy resins and polyamine hardeners or hydroxy-functional resins and polyisocyanate cross-linking agents. The primers and/or primer surfacers used may be solvent-based or water-based. The waterborne basecoat layers may however also be applied to intact existing coatings (finishes or repair coatings) or primed new parts, e.g. primed plastics parts.

The coating compositions prepared with the coating system according to the invention can be cured at room temperature or force-cured at higher temperatures, for example of up to 80° C., preferably of 40 to 60° C. They can, however, also be cured at higher temperatures of for example 80–150° C.

Subsequently, the applied base coat compositions can be coated over with transparent clear coats. The clear coats may thereby be applied to the base coat layer either after drying and/or curing of the base coat layer or wet-on-wet, optionally after a flash-off phase. Preferably the clear coats are applied wet-on-wet to the base coat layer. The flash-off time may be, for example, 15 to 45 minutes, depending on the relative humidity.

In principle, suitable clear coats are all the well-known non-pigmented or transparent-pigmented coating agents of the kind customarily used, for example, in motor vehicle coating. The clear coats may be solvent-based or water-based. In particular, they are two-component clear coats based on chemically cross-linking binders, for example, based on hydroxy-functional binder components and polyisocyanate cross-linking agents. The clear coats may be cured as described above for the curing of the base coat. For example, curing may be carried out at room temperature over a period of several hours or by forced drying at temperatures of for example 40° C. to 60° C., e.g., within 30 to 80 minutes.

The components of the coating system according to the invention are stable during storage of for example up to 12 months. The coating compositions produced with the components of the coating system according to the invention are stable during storage for at least 6 months. The coating compositions are easy to filter before their use. The coating compositions prepared with the coating system according to the invention provide coatings which are advantageous over the prior art. The coatings show an improved sagging resistance. It is possible for example to apply, without running, in layer thicknesses of about 70 $\mu$m and above. This is of particular advantage at critical places such as corners, edges or flanges or overlapping zones. The coating compositions show an increased covering capacity, in particular when using badly covering pigments. The same covering capacity can be obtained with fewer spraying operations and therefore with less consumption of coating material. The coating compositions prepared with the coating system according to the invention result in coatings which cover very well the irregularities of the substrate, such as sanding marks, on an applied and sanded filler. No after-marks, for example sanding marks, are observed at the surface of the filler through the waterborne basecoat applied thereover. The coatings further show very good and uniform special effect properties.

The invention will be explained in more detail on the basis of the examples below.

EXAMPLES

Example 1

Preparation of a component A)

An aqueous polyurethane dispersion 1 according to U.S. Pat. No. 5,556,912, preparative example 1, polyurethane dispersion A (based on a (meth)acrylated polyurethane resin) and an aqueous polyurethane dispersion 2 according to DE-A-43 44 063, preparative example 2, polyurethane dispersion B (based on an OH-functional polyurethane prepolymer wich is chain extended with diisocyanate), are used.

Component A) is prepared by mixing together the following components:

23.6 parts by weight polyurethane dispersion 1 (30 wt % solids)

11.8 parts by weight polyurethane dispersion 2 (36 wt % solids)

46.1 parts by weight fully demineralized water
7.2 parts by weight n-butanol
4.0 parts by weight butyl glycol
0.5 parts by weight N-methylpyrrolidone
0.3 parts by weight of a commercially available corrosion inhibitor to prevent aluminium gassing (Additol XL 250, VIANOVA)
2.1 parts by weight of a thickener (Viskalex HV 30, Ciba)
0.2 parts by weight N,N-dimethylethanolamine
4.1 parts by weight of a commercially available aluminium paste (65% in test benzene, Eckart)

Example 2

Preparation of a component C)

Polyurethane binders analogous to Example 1 are used. Component C) is prepared by mixing together the following components:
23.6 parts by weight polyurethane dispersion 1
11.8 parts by weight polyurethane dispersion 2
21.1 parts by weight fully demineralized water
12.1 parts by weight butyl glycol
1.3 parts by weight of a thickener (Viskalex HV 30, Ciba)
0.14 parts by weight N,N-dimethylethanolamine
22.1 parts by weight titanium dioxide pigment
0.16 parts by weight of a defoamer (Tego Foamex 805, Tego-Chemie)
8.1 parts by weight of a commercially available polyurethane auxiliary grinding agent.

Example 3

Preparation of a Component B)

The following components are mixed together:
1 part by weight of a commercially available layered silicate (Optigel SH, Südchemie)
10 parts by weight of a polyurethane resin dispersion corresponding to U.S. Pat. No. 4,558,090, example (paste resin)
89 parts by weight fully demineralized water.

Example 4

Comparative Example

Preparation of a comparative Component B)

The following components are mixed together:
1 part by weight of a commercially available layered silicate (Optigel SH, Südchemie)
99 parts by weight fully demineralized water.

Example 5

Preparation of a Waterborne Basecoat 61.7 parts by weight of component A) prepared according to Example 1, 13.6 parts by weight of component B) prepared according to Example 3 and 24.7 parts by weight of component C) prepared according to Example 2, are mixed together while stirring and the spray viscosity is adjusted with 10 parts by weight fully demineralized water.

Example 6

Preparation of a Comparative Waterborne Basecoat 61.7 parts by weight of component A), prepared according to Example 1, 13.6 parts by weight of component B), prepared according to comparative Example 4, and 24.7 parts by weight of component C), prepared according to Example 2, are mixed together while stirring and the spray viscosity is adjusted with 10 parts by weight fully demineralized water.

Example 7

Application Example

A commercially available solvent-based two-component primer surfacer (isocyanate-cross-linking) (Standox® 2K-Nonstop-Füllprimer, Standox® 2K-Härter) was applied to steel plates coated by cathodic electrodeposition coating in dry film thicknesses of about 60 μm, cured for 30 minutes at 60° C. and subsequently sanded. Each waterborne basecoat prepared according to Example 5 and each comparative waterborne basecoat prepared according to Example 6 were applied in one spraying pass to the thus obtained primer surfacer layer in a dry film thickness totalling about 12 μm.

The thus obtained water-based coating layers were each subsequently coated over after a flash-off time of about 20 minutes with a commercially available two-component solvent-based clear coat (isocyanate-cross-linking) (Standocryl® 2K HS-Klarlack, Standox® 2K HS-Härter, long). After a flash-off time of 10 minutes the coating was cured for 30 minutes at 60° C.

The technical results of the coating are shown in the table below.

|  | Example according to the invention | Comparative example |
| --- | --- | --- |
| storage stability of the waterborne basecoat | stable for at least 6 months | thickening within a week |
| Sagging resistance (sagging limit) | 70 μm | 50 μm |
| Covering of sanding marks | very good covering | after-marking of the sanding marks |

What is claimed is:

1. Coating system for the preparation of aqueous coating compositions, comprising the combination of, as separate components, A) 55–95 wt-% of at least one special effect pigment composition comprising water, at least one special effect pigment, and at least one water-dilutable resin selected from the group of polyurethane resin, polyester resin and poly(meth)acrylate resin, the amount of said water constituting at least 15 wt % based on the total weight of said component A, and B) 5–45 wt-%, to total 100% of the total weight of said components A plus B, of a pigment-free composition comprising B1) 0.3–5.0 wt-% of at least one inorganic layered silicate, B2) 1.0–20.0 wt-% of at least one water-dilutable polyurethane resin, B3) 75.0–98.7 wt-% water, the weight percents of B1, B2 and B3 adding up to 100 wt-% of said component B.

2. Coating system according to claim 1, characterized in that said component A contains 30–75 wt-% water.

3. Coating system according to claim 1, characterized in that said component B contains 0.5–3.0 wt-% component B1, 2.0–10 wt-% component B2 and 87–97.5 wt-% component B3.

4. Coating system according to claim 1, characterized in that said resin in said component A is said water-dilutable polyurethane resin.

5. Coating system according to claim 1, characterized in that said water-dilutable polyurethane resin in said component B has an acid value of 10–50 mg KOH/g and a number average molecular mass Mn of 3,000–200,000, which is obtained by reacting at least one polyester polyol having an OH-value of 35–200 mg KOH/g and a number average molecular mass of 500–5000 g/mol with a compound having at least one group which is reactive with respect to NCO-groups and at least one acid group capable of producing anions and with at least one polyisocyanate.

6. Coating system according to claim 1, characterized in that the amount of said component B is such that the amount of said inorganic layered silicate B1 in said component B is 0.1–1.5 wt-%, based on the amount of said component A.

7. Coating system according to claim 1, characterized in that it contains in addition to said component A and said component B at least one additional separate component selected from the group consisting of:

C) at least one colour composition comprising water, at least one colour pigment, and at least one water-dilutable resin selected from the group of polyurethane resin, polyester resin, and poly(meth)acrylate resin, D) at least one cross-linking composition comprising at least one cross-linking agent, and E) at least one binder composition comprising at least one water-dilutable binder.

8. Coating system according to claim 7, characterized in that resin in said component C is said polyurethane.

9. Coating system according to claim 7, characterized in that said cross-linking agent in said component D contains at least one polyisocyanate.

10. Process comprising mixing together said components A and B of claim 1 to form a waterborne basecoat.

11. Process comprising applying said waterborne base coat of claim 10 to vehicles and/or vehicle parts in vehicle repair coating.

* * * * *